United States Patent Office 3,539,599
Patented Nov. 10, 1970

3,539,599
6,7-METHYLENE-9β,10α-STEROIDS AND METHODS FOR THE PREPARATION THEREOF
Harmen van Kamp, Weesp, Netherlands, assignor, by mesne assignments, to U.S. Philips Corporation, New York, N.Y., a corporation of Delaware
No Drawing. Filed Jan. 29, 1968, Ser. No. 701,051
Claims priority, application Great Britain, Feb. 2, 1967, 5,028/67
Int. Cl. C07c *169/20, 169/34*
U.S. Cl. 260—397.3                  10 Claims

ABSTRACT OF THE DISCLOSURE 6,7-methylene-9β,10α steroids of the androstane or pregnane series are prepared. Examples are 6α-fluoro-6β, 7β methylene-17β-hydroxy-9β,10α-androst-4-en-3- or 17-acetate and 6β,7β-methylene-9β,10α-pregna - 1,4-diene-3,20-dione.

---

The invention relates to new 6,7-methylene-9β,10α-steroids of the formula

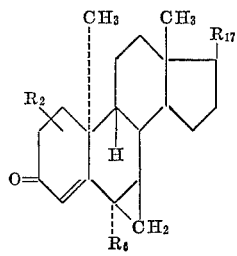

in which formula

R$_2$ represents a single or double bond between the carbon atoms 1 and 2,
R$_6$ is a hydrogen, a chloro or a fluoro atom, and
R$_{17}$ is a hydroxyl group, an esterified hydroxyl group, an acetyl group or a —CHOH—CH$_3$ group.

The pregnane compounds of the invention are progestational agents having an influence on the pituitary. In particular the pregnane compounds wherein R$_6$ is a halogen have a strong inhibiting action on the gonadotropins. The compounds of the pregnane series where R$_6$ is a hydrogen atom have in addition to the activities mentioned above, an anti-estrogenic activity.

The androstane compounds of the invention exhibit an anabolic-androgenic activity.

The inhibition of the pituitary activity may be useful in cases of hyperproduction of gonadotropins and further in the treatment of menopausal patients or treatment of puberas praecox.

The compounds of the invention wherein R$_{17}$ is a —CHOH—CH$_3$ group may be used as starting material for the preparation of compounds with hormonal activities.

The hydrogen atoms or methyl groups at the carbon atoms 8, 9, 10, 13, and 14 of the compounds according to the invention have the same stereochemical configuration as the corresponding hydrogen atoms and methyl groups in dihydro-isolumisterone.

Castells et al., Proc. of the Chemical Society, 1958, p. 7, have shown that dihydro-isolumisterone has the configuration 8β,9β,10α-methyl,13β-methyl,14α.

The novel steroids of the invention are indicated as 9β,10α-steroids to indicate at which carbon atoms (9 and 10) the configuration deviates from the normal steroids and in which sense (9β,10α in distinction to the 9α,10β-configuration of the normal steroids).

The methylene group connected to carbon atoms 6 and 7 and the substituents R$_{17}$ at carbon atom 17 have the β-configuration, whereas the substituent R$_6$ occupies the α-position.

When R$_{17}$ represents an esterified hydroxyl group, then the acyl part of said esterified hydroxyl group may contain from 1-20 carbon atoms and is preferably the acyl group of a saturated or unsaturated aliphatic mono-, di- or tricarboxylic acid, aromatic carboxylic acid, mixed aliphatic-aromatic carboxylic acid or a saturated or unsaturated alicyclic- or mixed aliphatic-alicylclic monocarboxylic acid, especially those having from 1-16 carbon atoms. Examples of acyloxy groups are: formoxy, acetoxy, propionoxy-, butyroxy-, acyloxy groups of oleic acid, palmitic acid, caproic acid, pivalic acid, succinic acid, undecyloic acid, malonic acid, citric acid, hexahydrobenoic acid, phenylacetic acid, β-cyclopentyl-propionic acid, β-cyclohexylpropionic acid.

Preferred compounds of the underlying invention are:
6β,7β-methylene-9β,10α-pregn-4-en-3,20-dion,
6β,7β-methylene-9β,10α-pregna-1,4-diene-3,20-dion,
6β,7β-methylene-20βhydroxy-9β,10α-pregn-4-en-3-on,
6α-chloro,6β,7β-methylene-9β,10α - pregna-1,4-dien-3-20-dion,
6α-chloro-6β,7β-methylene-9β,10α-pregn-4-en-3,20-dion,
6β-7β-methylene-17β-hydroxy-9β,10α-androst-4-en-3-on,
6β,7β-methylene-17β-hydroxy-9β,10α - androst-4-en-3-on 17-phenyl-propionate,
6α-fluoro-6β,7β-methylene-17β - hydroxy-9β,10α-androst-4-en-3-on 17-acetate,
6α-chloro-6β,7β-methylene-17β-hydroxy-9β,10α - androst-4-en-3-one, and
6α-chloro-6β,7β - methylene - 17β-hydroxy - 9β,10α-androsta-1,4-dien-3-one 17 acetate.

Other compounds of the invention are:
6β,7β-methylene-17β - hydroxy-9β,10α - androsta-1,4-dien-3-on, 6β,7β-methylene-17β-hydroxy-9β,10α-androsta-1,4-dien-3-on 17-acetate and the corresponding 17-formate-, 18-propionate-, 17-butyrate-, 17-enanthate-, 17-pivalate-, 17-undecylenate, 17-caproate-, 17-palimitate-, 17-stearate- and 17-phenylpropionate esters, 6β-7β-methylene-17β-hydroxy-9β,10α - androst-4-en-3-one 17-acetate and the corresponding 17-formate, 17-propionate, 17-butyrate-, 17-enanthate-, 17-pivalate-, 17-undecylate-, 17-caproate-, 17-palmitate and 17-stearate esters, 6α-fluoro-6β,7β - methylene-9β,10α - pregn-4-en-3,20-dion, 6α-fluoro-6β,7β-methylene-9β,10α-pregna-1,4-dien-3, 20-dion, 6α-fluoro-6β,7β - methylene-17β-hydroxy-9β,10α-androsta-1,4-diene-3-one 17-acetate and the corresponding 17-formate-, 17-pripionate-, 17-butyrate-, 17-enanthate-, 17-pivalate-, 17-undecylenate-, 17-caproate-, 17-palmitate-, 17-stearate-, and 17-phenylpropionate esters, 6α-fluoro-6β,7β - methylene - 17β-hydroxy-9β,10α-androsta-4-en-3-on 17-formate and the corresponding 17-propionate-, 17-butyrate-, 17-enanthate-, 17-privalate-, 17-undecylenate-, 17-caproate-, 17-palmitate-, 17-stearate and 17-phenylpropionate esters.

6α-fluoro-6β,7β-methylene - 17β-hydroxy - 9β,10α-androsta-1,4-dien-3-on,

6α-chloro - 6β,7β - methylene-17β-hydroxy-9β, 10α-androsta-4-en-3-on 17-acetate and the corresponding 17-formate, 17-propionate-, 17-butyrate-, 17-enanthate-, 17-pivalate-, 17-undecylenate-, 17-caproate-, 17-palmitate-, 17-stearate- and 17-phenylpropionate esters, 6α-chloro-6β, 7β-methylene-17β-hydroxy-9β, 10α-androsta-1,4-dien-3-one 17-formate and the corresponding 17 - propionate, 17-butyrate-, 17-enanthate-, 17-pivalate-, 17-undecylenate-, 17-caproate-, 17-palmitate-, 17-stearate- and 17-phenylpropionate esters.

The compounds according to the invention may be prepared according to methods known per se for the preparation of analogous compounds.

In particular the methods of producing the new 9β, 10α-steroids are characterized in that compounds of the general formula:

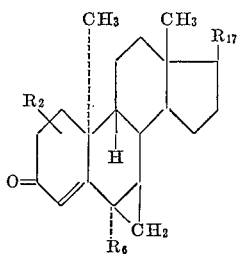

in which formula $R_2$ represents a single or double bond between carbon atoms 1 and 2,
$R_6$ represents a hydrogen, chloro or fluoro atom, and
$R_{17}$ represents a hydroxy, acetyl, esterified hydroxyl or a —CHOH—CH$_3$ group,
are produced in that (a) A compound of the formula

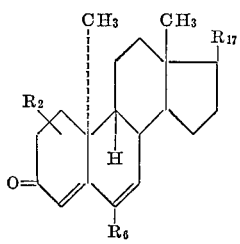

in which formula $R_2$ represents a single or double bond between carbon atoms 1 and 2,
$R_6$ represents a chloro or fluoro atom, and
$R_{17}$ represents a hydroxyl, acetyl, esterified hydroxyl or a —CHOH—CH$_3$ group, is reacted with dimethylsulfoxoniummethylide to produce the corresponding 3-keto-4-dehydro-6α-halogeno-6β,7β-methylene-9β,10α-steroid.

(b) A compound of the formula

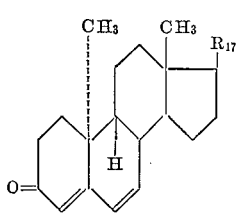

in which formula $R_{17}$ represents a hydroxyl, acetyl, esterified hydroxyl or a —CHOH—CH$_3$ group,
is reacted with dimethylsulfoxoniummethylide to produce the corresponding 3-keto-4-dehydro-6β,7β-methylen-9β,10α-steroid.

(c) A compound of the formula

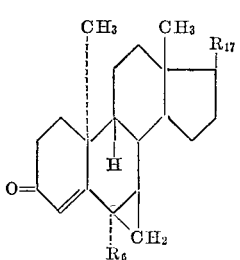

in which formula $R_6$ represents a hydrogen, chloro or fluoro atom, and
$R_{17}$ represents a hydroxyl, acetyl, esterified hydroxyl or a —CHOH—CH$_3$ group, is dehydrogenated to introduce a Δ$^1$-double bond.

(d) A compound of the formula

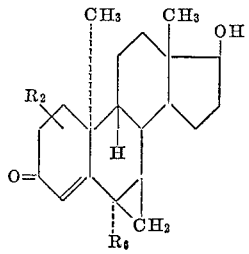

in which formula $R_2$ represents a single or double bond between carbon atoms 1 and 2, and
$R_6$ represents a hydrogen, chloro or fluoro atom, is esterified to produce the corresponding 17-esterified hydroxyl group.

(e) A compound of the formula

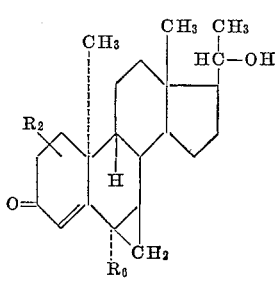

in which formula $R_2$ represents a single or double bond between carbon atoms 1 and 2, and
$R_6$ represents a hydrogen, chloro or fluoro atom is oxidized to produce a 17β-CO—CH$_3$ compound.

The methods set forth above under (b) have been described in part in literature (Krakowen, G. W. and Van Dine, H. A., The Synthesis of Steriodal Cyclopropano Ketones, Journal of Organic Chmistry, 31, 3467–3473 (1966) and Wepsong, N. H., Edwars, J. A. and Fried, J. H., Tetrahydron Letters, 1966, 1841).

The dimethylsulfoxonium reagent (methods (a) and (b)) is prepared by reaction of trimethylsulfoxonium iodide with a base e.g. alkali hydrides or hydroxides in the presence of a solvent e.g. dimethylsulfoxide. The reaction for the preparation of the inventive compounds according to the methods (a) and (b) is carried out in the presence of a solvent at a reaction temperature which may be varied between 0 and 80° C. but which is preferably between 15–30° C. Suitable solvents are dimethylsulfoxide, ethers such as diethylether, tetrahydrofuran, dioxan or mixtures thereof.

The methods enumerated above under (c)–(e) inclusive have been described in literature in more detail. A survey thereof follows below.

INTRODUCTION OF A Δ$^1$-DOUBLE BOND (1) By direct 1-dehydrogenation with iodine pentoxide;

(2) By direct 1-dehydrogenation with selenium dioxide, J. H. Fried et al., J. Am. Chem. Soc., 81, 1235 (1959); H. Bouwers et al., J. Am Chem. Soc. 81, 5991 (1959);

(3) By direct 1-dehydrogenation with 2,3-dichloro-5, 6-dicyanobenzoquinone, D. Burn, et al., Proc. Chem. Soc., 1960, 14;

(4) By direct 1-dehydrogenation with lead tetraacetate, R. L. Clarks, J. Am. Chem. Soc., 77, 661 (1959); R. Joly, Bull. Soc., 366 (1958);

(5) By microbiological 1-dehydrogenation, A. Nobile et al., J. Am. Chem. Soc., 77, 4184 (1955).

ESTERIFICATION OF A 17-HYDROXY GROUP

The esterification may be carried out with the previously mentioned acids, their acid anhydrides or acid halides, in the presence of a catalyst such as p-toluenesulphonic acid or pyridine.

OXIDATION OF A 20-HYDROXY GROUP TO PRODUCE A 20-KETO GROUP (1) With Jones' reagent, i.e. oxidation in acetone with an aqueous solution of chromic acid, K. Bowden, J. M. Heilbron, E. R. H. Jones and B. C. L. Weedon, J. Chem. Soc., 1946, 39.

(2) With dicyclohexylcarbodiimide in dimethylsulfoxide, K. E. Pfitzner and J. G. Moffat, J. Am. Chem. Soc., 87, 5661 (1965).

Of the numerous methods listed above, the method mentioned under (d) deserves some special interest.

It was found that the addition of the methylene group to the 6-chloro or 6-fluoro starting product took place at the double bond between the carbon atoms 6 and 7, even if the starting product contains a double bond between the carbon atoms 1 and 2.

Furthermore, it was found that the attached methylene group always occupies the $\beta$-position, whereas the $R_6$ substituent turns to the $\alpha$-position when the reagent attacks the 6,7-double bond. These results were, in view of the literature reports concerning the addition of a methylene group to normal steroids, very surprising (Krakower, G. W. and Van Dine, H. A., The Synthesis of Steroidal Cyclopropano Ketones, Journal of Organic Chemistry, 31, 3467–3573 (1966)).

The compounds according to the invention may be worked up to pharmaceutical or veterinarian preparations in the usual way. Thus injection liquids may be produced by dissolving a methylene chloride solution of an active compound in arachid oil and by evaporating methylene chloride subsequently. Suppositaria may be produced by mixing intimately an active compound with an ester of a higher aliphatic alcohol and a higher carboxylic acid, e.g. with carbowaxes or with cacao-butter or with a mixture of gelatine and glycerol. Further the inventive product may be worked up in tablets using the usual fillers such as starch or binders or lubricants, for example magnesium stearate, carboxy methylcellulose and the like.

The invention may be further illustrated by the following examples.

EXAMPLE 1

6$\beta$,7$\beta$-methylene-20$\beta$-hydroxy-9$\beta$,10$\alpha$-pregn-4-en-3-one To a solution of 6 g. of trimethylsulphoxonium iodide in 60 ml. of dimethyl sulphoxide 0.7 g. of sodium hydride was added. After stirring for 75 minutes at room temperature the mixture was filtered and the filtrate was added to a solution of 3 g. of 20$\beta$-hydroxy-9$\beta$,10$\alpha$-pregna-4,6-dien-3-one in 40 ml. of dimethylsulfoxide. The solution was allowed to stand at room temperature for 2.5 days and then poured into ice-water. The steroid material was extracted with methylene chloride. After usual work-up and evaporation of the solvents, the residue was chromatographed on silicagel to yield 1.9 g. of 6$\beta$,7$\beta$-methylene-20$\beta$-hydroxy-9$\beta$,10$\alpha$-pregn-4-en-3-one with M.P. 128.5–130° C., $[\alpha]_D^{25}$=—300° C. and $\epsilon\lambda$ 295.5 Nm.=15.500.

EXAMPLE II

6$\beta$,7$\beta$-methylene-9$\beta$,10$\alpha$-pregn-4-ene-3,20-dione

To a solution of 1.44 g. of 6$\beta$,7$\beta$-methylene-20-hydroxy-9$\beta$,10$\alpha$-pregn-4-en-3-one in 150 ml. of acetone was added dropwise at a temperature between 0 and —5° C., 2.9 ml. of an 8 N aqueous solution of chromic acid (67 g. of CrO$_3$ and 58 ml. of concentrated sulphuric acid dissolved in water to a final volume of 250 ml. After additional stirring for 3 minutes the reaction mixture was diluted with water and worked up. The nearly pure 6$a$,7$\beta$-methylene-9$\beta$,10$\alpha$-pregn-4-ene-3,20-dione was recrystallized from methylene chloride/aceton to yield an analytically pure sample with M.P. 210.5–212° C., $[\alpha]_D^{25}$=—189° and $\epsilon\lambda$ 259.5 Nm.=15.500.

EXAMPLE III

6$\beta$,7$\beta$-methylene-9$\beta$,10$\alpha$-pregn-4-ene-3,20-dione

According to the method described in Example I 6$\beta$,7$\beta$-methylene - 9$\beta$,10$\alpha$ - pregn-4-ene-3,20-dione was prepared from 9$\beta$,10$\alpha$-pregn-4,6-diene-3,20-dione. After chromatography and recrystallization the compound melted at 210.5–212° C.

EXAMPLE IV

6$\alpha$-chloro-6$\beta$,7$\beta$-methylene-9$\beta$,10$\alpha$-pregn-4-ene-3,20-dione To a solution of 4 g. of trimethylsulphoxonium iodide in 80 ml. of dimethyl sulphoxide 540 ml. of sodium hydride (1080 mg.) of dispersion in oil (50%) were added. After stirring for 45 minutes at 20° C. a solution of 4 g. dride (1080 mg.) of dispersion in oil (50%) were added. of tetrahydrofuran was added. The mixture was stirred for 35 minutes at 20° C. in a nitrogen atmosphere and decomposed by the addition of ethanol and water. The steroid material was extracted with benzene. The benzene extract was washed with water. After drying and evaporation of the solvents, the residue was chromatographed on silicagel to yield 1.5 g. of 6$\alpha$-chloro-6,7-methylene-9$\beta$,10$\alpha$-pregn - 4 - ene - 3,20-dione with M.P. 188–188.5° C., $[\alpha]_D^{25}$=+4.5° and $\epsilon\lambda$ 257 Nm.=10.400.

EXAMPLE V

6$\alpha$-chloro-6$\beta$,7$\beta$-methylene-9$\beta$,10$\alpha$-pregan-1,4-diene-3,20-dione To a solution of 3.1 g. of trimethylsulphoxonium iodide in 37.5 ml. of dimethyl sulfoxide 0.37 g. of sodium hydride was added. After stirring for 2 hours at room temperature in a nitrogen atmosphere the mixture was filtered and the filtrate was added to a solution of 3.1 g. of 6-chloro-9,10-pregna-1,4,6-triene-3,20-dione in 125 ml. of dimethyl sulphoxide. The solution was allowed to stand at 17° C. for 2 hours and then poured into ice-water. The steroid material was extracted with methylene chloride. After usual work-up and evaporation of the solvents, the residue was chromatographed on silicagel to yield 6-chloro-6$\beta$-methylene - 9$\beta$,10-pregna-1,4-diene-3,20-dione with M.P. 157–159° C., $\epsilon\lambda$ 244 Nm.=14.000.

EXAMPLE VI

6$\alpha$-chloro-6$\beta$,7$\beta$-methylene-9$\beta$,10$\alpha$-pregan-1,4-diene-3,20-dione To a solution of 3 g. of 6-chloro-6$\beta$,7$\beta$-methylene-9$\beta$,10$\alpha$-pregn-4-ene-3,20-dione and 27 g. of D.D.Q. in 200 ml. of dioxan, 1.5 ml. of a solution of anhydrous hydrogen chloride in dioxan (133 mg./ml.) were added and the mixture was allowed to stand at room temperature for 90 minutes. Then 5 g. of sodium-bicarbonate were added and the mixture was stirred until the solution became neutral. After filtration, the filtrate was heated under reflux for 90 minutes and then most of the dioxan was removed under reduced pressure. To the residue 300 ml. of N sodium hydroxide were added and the mixture was extracted with methylene chloride. After usual work-up 6-chloro-6$\beta$, 7$\beta$-methylene - 9$\beta$,10$\alpha$-pregna-1,4-diene-3,20-dione was obtained with M.P. 157–159° C.

EXAMPLE VII

6$\beta$,7$\beta$-methylene-9$\beta$,10$\alpha$-pregna-1,4-diene-3,20-dione

According to the method described under Example VI, 6$\beta$,7$\beta$ - methylene-9$\beta$,10$\alpha$-pregna-1,4-diene-3,20-dione was synthesized from 6β,7β-methylene-9β,10α-pregna-4-ene-3,20-dione.

EXAMPLE VIII

6β,7β-methylene-17β-hydroxy-9β,10α-androst-4-en-3-one

According to the method, described in Example I, 6β,7β-methylene - 17β - hydroxy-9β,10α-androst-4-en-3-one was prepared from 17β-hydroxy-9β,10α-androsta-4,6-dien-3-one. The compound melted at 116.5–118° C. after resolidification in the capillary tube at 137.5–139° C., $[\alpha]_D^{25} = -300°$ C. and ελ 259.5 Nm.=15.300.

EXAMPLE IX

6α-chloro-6β,7β-methylene-17β-hydroxy-9β,10α-androst-4-en-3-one

According to the method described in Example IV, 6α-chloro-6,7-methylene-17β-hydroxy - 9β,10α - androst-4-en-3-one was prepared starting from 6-chloro-17β-hydroxy-9β,10α-androsta-4,6-dien-3-one or its acetate. The compound melted at 163–164° C., $[\alpha]_D^{25} = -69°$ and ελ 255.5 Nm.=10.000.

EXAMPLE X

6α-chloro-6,7-methylene-17β-hydroxy-9β,10α-androsta-1,4-dien-3-one 17 acetate

In accordance with the method described in Example V, 6-chloro-17β-hydroxy - 9β,10α - androsta-1,4,6-trien-3-one 17-acetate was converted into 6α-chloro-6,7-methylene-17β-hydroxy - 9β,10α - androsta-1,4-dien-3-one 17-acetate (after reacetylation) with M.P. 131–133° C. and ελ 244 Nm.=14.000.

EXAMPLE XI

6β,7β-methylene-17β-hydroxy-9β,10α-androst-4-en-3-one 17-phenylpropionate

6β,7β-methylene - 17β - hydroxy-9β,10α-androst-4-en-3-one as described in Example VIII was esterified with phenylpropionyl chloride in the presence of pyridine to the corresponding 17-phenylpropionate compound.

EXAMPLE XII

6α-fluoro-6β,7β-methylene-17β-hydroxy-9β,10α-androst-4-en-3-one 17-acetate

To a solution of 1 g. of trimethylsulphoxonium iodide in 20 ml. of dimethylsulphoxide 110 mg. of sodium hydride were added. After stirring for 30 minutes at 20° C., 1 g. of powdered 6 - fluoro-17β-hydroxy-9β,10α-androsta-4,6-diene-3-one 17-acetate was added. The mixture was stirred for 2 hours at 20° C. and then worked up. The residue obtained after evaporation of the solvents from the dried extract was reacylated with acetic anhydride in the presence of pyridine. Usual work-up gave after chromatography and recrystallization from petroleum ether-ether 6α-fluoro - 6,7 - methylene-17β-hydroxy-9β,10α-androst-4-en-3-one 17-acetate with M.P. 112.5–113° C.

EXAMPLE XIII 2 g. of 6α-chloro-6β,7β-methylene-9β,10α-pregn-4-ene-3,20-dione were dissolved in chloroform, which solution was mixed homogenously with 194 g. of lactose. The mixture was dried at 40° C. during 1 hour. The mixture was wettened with a 10%-ic aqueous solution of 2 g. of gelatine and subsequently ground through a 20 mesh sieve. The mixture was dried at 40° C. during 24 hours, whereupon the granules were ground through a 20 mesh sieve. The mixture was weighed and then had added to it proportional amounts of talcum venetum and magnesium stearate in amounts of optimal 25 mg. and 2 mg. respectively. The resulting mixture was homogenized and worked up to tablets of 225 mg. each.

EXAMPLE XIV

Injection liquids of 6β,7β-methylene-9β,10α-pregn-4-ene-3,20-dione (active ingredient) were made as follows.

5.00 g. of the active ingredient were dissolved in 90 ml. of 2% w./v. benzylalcohol and 46% w./v. benzylbenzoate in ricinic oil at a temperature of 60° C. The solution was cooled to room temperature and replinished to 100 ml. with the ricinic oil solution aforesaid. The mixture was homogenized by stirring and filtrated. Ampouls and vials were filled with the filtrated solution, subsequently sealed and then sterilized by heating for one hour, at 120° C.

What is claimed is:

1. A compound of the formula

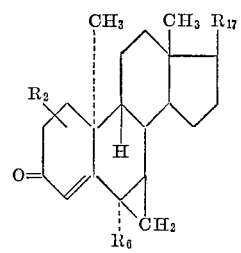

in which formula $R_2$ represents a single or double bond between the carbon atoms 1 and 2, $R_6$ represents a hydrogen, a chloro or a fluoro atom and $R_{17}$ represents a hydroxyl, esterified hydroxyl, acetyl or a —CHOH—CH₃ group.

2. A compound of claim 1 of the formula

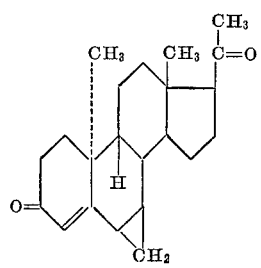

3. A compound of claim 1 of the formula

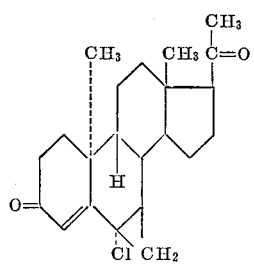

4. A compound of claim 1 of the formula

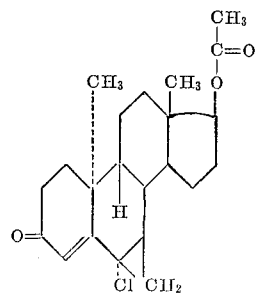

5. A compound of claim 1 of the formula
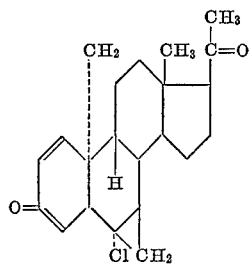
6. A compound of claim 1 of the formula
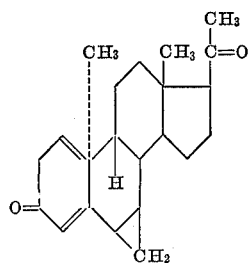
7. A compound of claim 1 of the formula
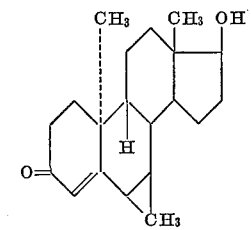
8. A compound of claim 1 of the formula
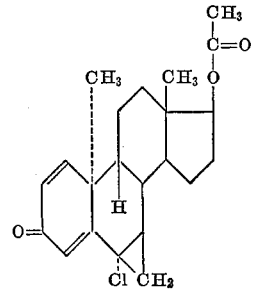
9. A compound of claim 1 of the formula
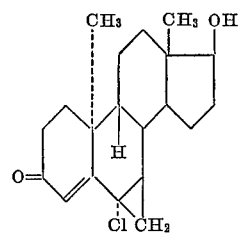
10. A compound of claim 1 of the formula
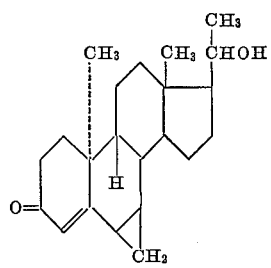
References Cited
UNITED STATES PATENTS
| | | | |
|---|---|---|---|
| 3,198,792 | 8/1965 | Reerink et al. | 260—239.55 |
| 3,401,163 | 9/1968 | Krakower | 260—239.55 |
| 3,438,977 | 4/1969 | Beard et al. | 260—239.55 |
HENRY A. FRENCH, Primary Examiner
U.S. Cl. X.R.
260—397.4, 999

UNITED STATES PATENT OFFICE
CERTIFICATE OF CORRECTION

Patent No. 3,539,599 (PHN 2179) Dated November 10, 1970

Inventor(s) HARMAN VAN KAMP

It is certified that error appears in the above-identified patent and that said Letters Patent are hereby corrected as shown below:

Column 9, claim 6, change the formula to read as follows

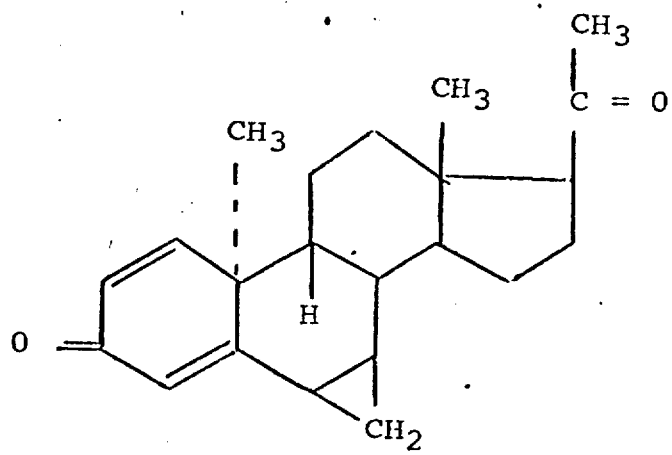

Column 9, claim 7, change the formula to read as follows:

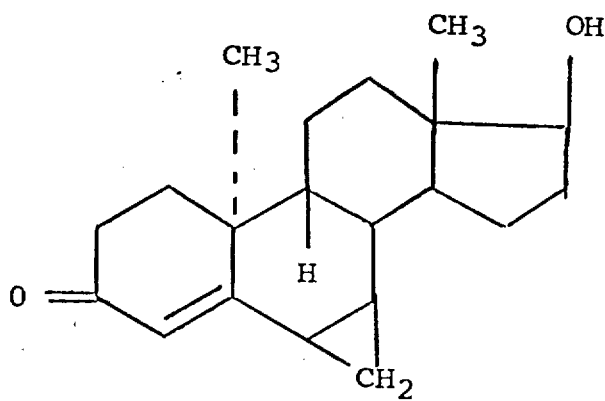

Signed and sealed this 15 day of June 1971.

(SEAL)
Attest:

EDWARD M. FLETCHER, JR.

WILLIAM E. SCHUYLER, JR.